United States Patent [19]
Wilke

[11] Patent Number: 4,607,973
[45] Date of Patent: Aug. 26, 1986

[54] FASTENING ARRANGEMENT FOR RELEASABLY INTERCONNECTABLE MOUNTED AND MOUNTING MEMBERS, AND PROCESS FOR MAKING THE SAME

[76] Inventor: Rudolf Wilke, 4 Marsberger Strasse, 3548 Arolsen, Fed. Rep. of Germany

[21] Appl. No.: 347,881

[22] Filed: Feb. 11, 1982

[30] Foreign Application Priority Data

Feb. 13, 1981 [DE] Fed. Rep. of Germany ....... 3105217

[51] Int. Cl.[4] .......................... B25G 3/00; F16D 1/00
[52] U.S. Cl. .......................................... 403/9; 403/328
[58] Field of Search .................... 403/9, 328; 292/352, 292/353

[56] References Cited

U.S. PATENT DOCUMENTS

| | | | |
|---|---|---|---|
| 1,488,014 | 3/1924 | McDonald . | |
| 1,797,776 | 3/1931 | Jacobi | 292/352 |
| 1,958,363 | 5/1934 | Gold | 292/352 |
| 2,059,319 | 11/1936 | De Vries . | |
| 2,117,947 | 5/1938 | De Rome et al. . | |
| 2,534,012 | 12/1950 | Gadpaille | 292/353 |
| 3,245,694 | 4/1966 | Parker | 403/9 X |
| 3,314,118 | 4/1967 | Stanworth . | |
| 4,047,821 | 9/1977 | Hoke et al. . | |
| 4,102,124 | 7/1978 | Swager | 403/6 X |
| 4,433,854 | 2/1984 | Smith | 403/328 X |

FOREIGN PATENT DOCUMENTS

| | | |
|---|---|---|
| 244052 | 12/1965 | Austria . |
| 336435 | 5/1977 | Austria . |
| 1624844 | 6/1951 | Fed. Rep. of Germany . |
| 1029702 | 10/1958 | Fed. Rep. of Germany . |
| 1105018 | 4/1961 | Fed. Rep. of Germany . |
| 2300128 | 7/1974 | Fed. Rep. of Germany . |
| 2835556 | 2/1980 | Fed. Rep. of Germany . |
| 1309570 | 10/1962 | France . |
| 2057106 | 5/1971 | France . |
| 998513 | 7/1965 | United Kingdom . |

*Primary Examiner*—Andrew V. Kundrat

[57] ABSTRACT

A fastening arrangement for releasably interconnectable mounted and mounting members with an enhanced degree of theft-proofing, includes at least one female element on one of the members and at least one cooperating male element on another of the members. The female element is preferably provided on the mounted member in the form of a receiving opening having a cross-section corresponding to that of the male element, and a transverse bore extends through the wall of the member from its exterior to the receiving opening, the bore having an inner section and an outer section of which the latter has a small cross-section relative to that of the former and is preferably located so as to be not readily noticeable. The male element is preferably provided on the mounting member and is accommodated by the receiving opening substantially without play, and a transversely movable, outwardly biased locking pin is carried in a recess by the male element in a position on the same corresponding to that of the transverse bore in the female element, the portion of the locking pin normally projecting from the male element having a cross-section corresponding to that of, and being adapted to snap into, the inner section of the transverse bore. To disconnect a mounted member from a mounting member, a thin tool is inserted through the outer section of the transverse bore to depress the locking pin out of the inner section of the transverse bore and into its recess in the male element. A method of making a molded mounted member with its receiving opening and transverse bore combination is also disclosed.

8 Claims, 8 Drawing Figures

FASTENING ARRANGEMENT FOR RELEASABLY INTERCONNECTABLE MOUNTED AND MOUNTING MEMBERS, AND PROCESS FOR MAKING THE SAME

This invention relates to fastening arrangements for securing to one another releasably connectable mounted and mounting members having cooperating male and female elements, and to a process for manufacturing the members provided with the female elements intended for use in such fastening arrangements.

The term "mounted members" as used herein is especially intended to designate such structures as pushing and/or pulling grips or handles for doors or windows, sanitary or bathroom fixtures such as bathtub and shower safety bars, the mounting arms of towel supporting rods, soap dishes, toothbrush and cup holders, storage shelves or supports, or the like, as well as the cover parts of frames for hung mail boxes and the like. The term "mounting members" is used herein to designate such structures as bases or underparts which are adapted to be affixed to walls and doors for supporting the mounted members. Common to all of these mated or paired members is the fact that in each case a first member (usually the mounted member) has a female element in the form of a receptacle or receiving opening, while a second member (usually the mounting member) has a male element adapted to be inserted in such receiving opening or receptacle. A mounting member may also be a structure, designed to serve as a base or underpart or the like, which is adapted to be affixed to a wall, door or the like and has a form enabling it to be inserted as a unit into a receiving opening or receptacle that is provided on a cooperating upper part or the like and completely encloses or surrounds the base or underpart. In any such construction, the fastening arrangement is such that, in the connected state of the two members, a locking pin usually carried by the male element fits into a transverse bore usually provided in the female element and holds the two members together, if necessary in a configuration-completing state. A release of the two members from each other is rendered possible by the fact that the locking pin can be pushed out of the transverse bore by means of a tool which can be inserted into the bore from the outside.

In fastening arrangements of this type it is frequently found to be a drawback that the interconnection of the two members can be broken with a number of different tools and as a result is not adequately secure against vandalism and theft. From published German application No. DE-OS 28 06 417 it is already known to block the locking pins with the aid of special screws which can be operated only by means of special tools. Theft-proofing the arrangement in this manner is, however, both difficult to achieve and quite costly.

It is the main objective of the present invention, therefore, to provide a fastening arrangement of the class described which is suitable for use in many different applications and which is rendered substantially theft-proof in a very simple way, and also to provide a process for manufacturing such theft-proof fastening arrangements.

In a fastening arrangement according to the present invention, the transverse bore has an outer section which provides the requisite access to the locking pin and has a cross-section or diameter that is substantially smaller than the outer diameter or cross-section of the locking pin that is needed for purposes of a stable locking action. The two members of the fastening arrangement can, therefore, be separated from one another only by means of a special tool, e.g. by means of a steel rod or pin with a small diameter or cross-section corresponding to that of the outer section of the transverse bore, and also only by such persons who are familiar with the fastening mechanism and with the location of the outer section of the transverse bore which, because of its small diameter, is usually well hidden. Such a theft-proofing arrangement is not only adequate for most applications but can also be produced economically.

The formation of the transverse bore according to the process of the present invention in injection molded parts leads to the further advantage that during the injection molding process no complicated operations or tools are required. Normally an injection molding operation would require two core halves to be positioned in the mold cavity to define the receiving opening, with one of the core halves being provided with a projection corresponding to the diameter of the inner section of the transverse bore, and after the injection molding operation is completed the smooth-surfaced core half would be extracted first and then the one on which the projection is provided. This makes it necessary to have corresponding guides in the core and/or for the displacement of the molded parts, which not only is technologically complicated but also cannot even be achieved in the case of receptacles or receiving openings with small diameters such as are required, for example, for door pushing members or grips because of the small dimensions and tolerances encountered and also other reasons. Through the use of the process according to the present invention, by way of contrast, the receiving opening is filled during the injection molding operation solely by means of a single core element or by means of a permanent insert which itself defines the opening which greatly simplifies the injection molding operation.

The foregoing and other objects, characteristics and advantages of the present invention will be more clearly understood from the following detailed description of a number of embodiments thereof when read in conjunction with the accompanying drawings, in which.

Figure 6:
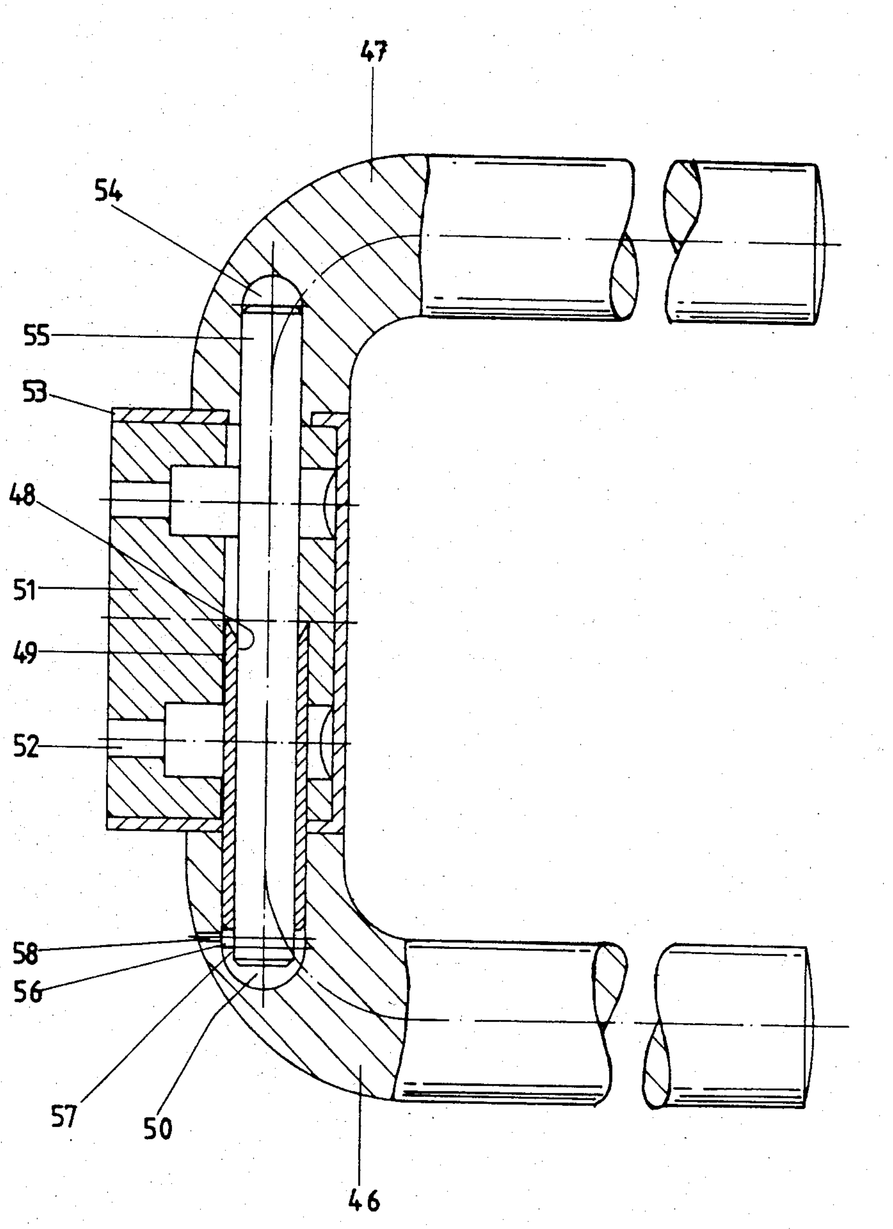
Figure 7:
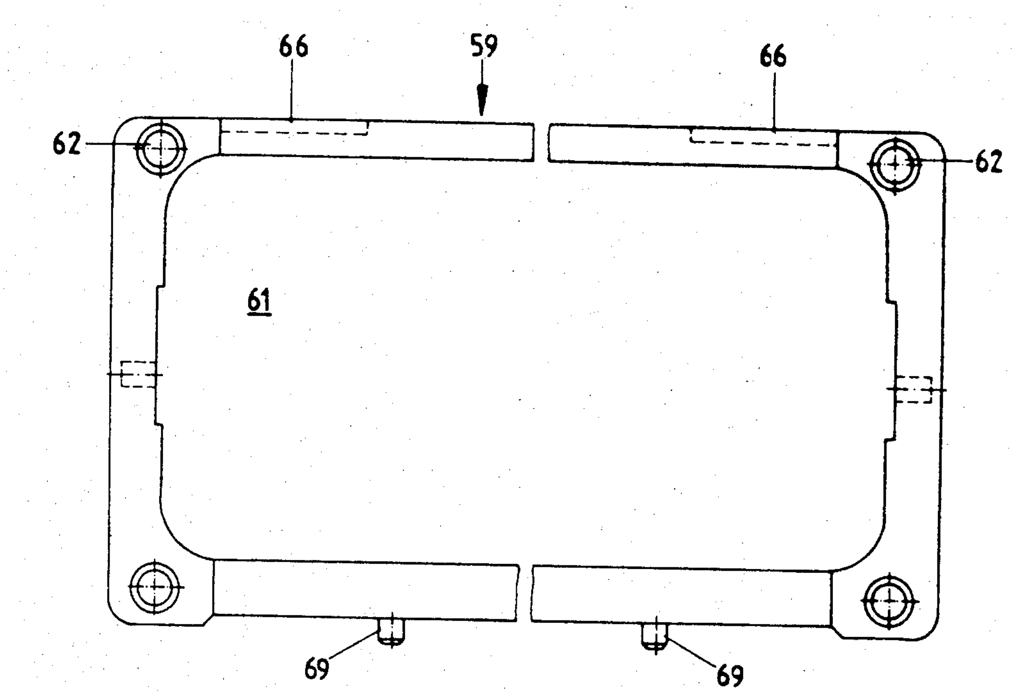
Figure 8:
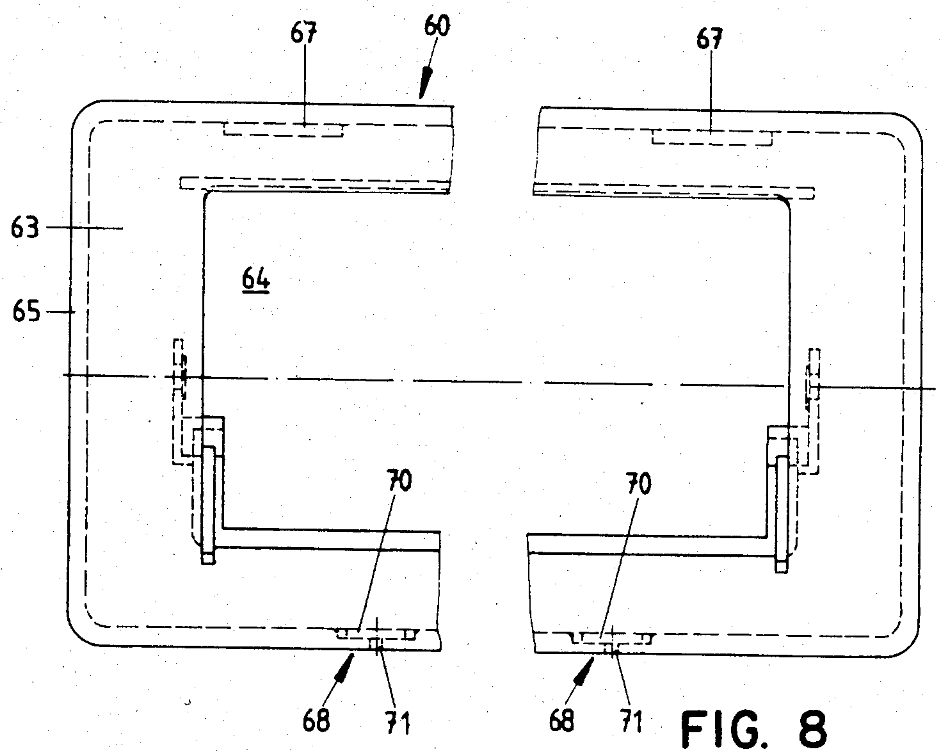

FIG. 6 is a fragmentary, partly sectional, illustration of a fastening arrangement according to the present invention as embodied in the two arms of a two-bar towel rack; and FIGS. 7 and 8 are plan views of the base or underpart and the upper or cover part, respectively, of a frame for a hung letter drop or mail box which are adapted to be interconnected by a fastening arrangement according to the present invention.

Figure 1:
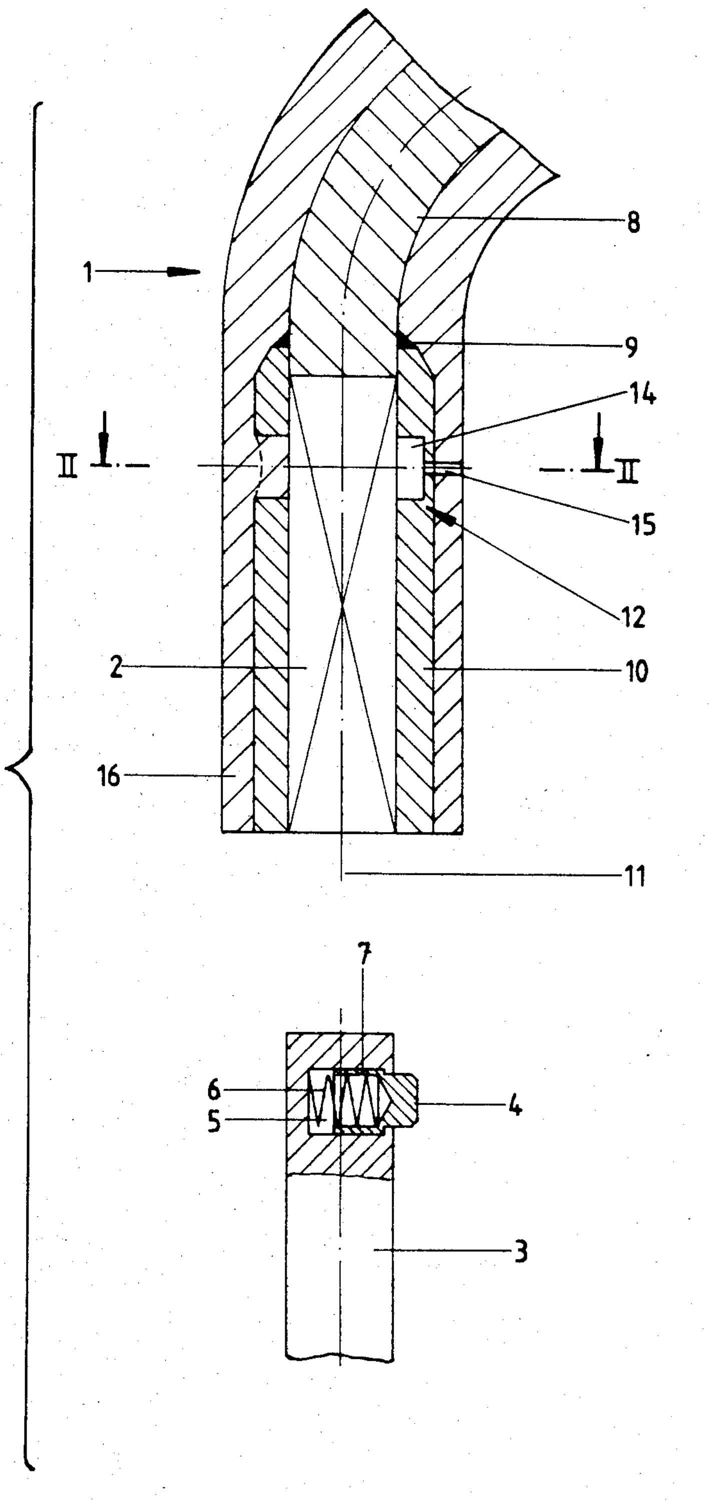
FIG. 1 is a fragmentary axial section through a fastening arrangement according to the present invention as utilized in two members (shown in separated condition) of a door pusher.
Figure 2:
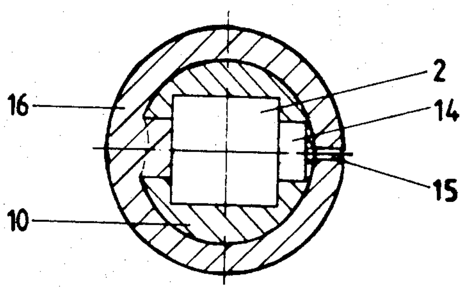
FIG. 2 is a cross-sectional view taken along the line II—II in FIG. 1.

Referring now to the drawings in greater detail, FIG. 1 shows a fastening arrangement according to the present invention as embodied in a door pusher which includes a first or mounted member in the form of a pusher or handle 1 provided with a receiving opening 2, and a second or mounting member juxtaposed to the first one, with the second member being shown in FIG. 1 only in the form of a prong 3 which is adapted to be received in the opening 2 and is connected in any suitable manner with the remainder of the second member (the latter may be a plate or the like secured to a door). The prong 3 has a quadrilateral cross-section (FIG. 2) and is dimensioned to be insertable into the opening or receptacle 2 with substantially no tolerance or play. For the purpose of releasable connection of the mounting prong 3 to the mounted pusher member 1, the prong is provided near its free end with a transversely oriented locking pin 4 which is slidably carried by the prong 3, one end of the pin being received in a recess 5 in the prong 3 in which is also located a spring 6 that biases the locking pin outwardly of the prong. The section 7 of the locking pin 4 located in the recess 5 has an enlarged diameter to prevent the pin from being completely extracted from the prong 3. The length of the recess 5 and the length of the portion of the locking pin normally projecting out of the recess 5 and beyond the outer surface of the prong 3 are so chosen that the locking pin can be pressed into the recess 5 against the pressure of the spring 6 sufficiently to bring the outer end of the pin flush with the outer surface of the prong 3.

The pusher or handle 1 in its gripping portion, which in FIG. 1 is shown as having its axis extending substantially horizontally, is provided with a steel core 8 to the end of which is secured, by means of a weld 9, a sleeved-shaped or tubular insert 10 in which the receiving opening 2 is formed. Adjacent its welded end the insert 10 is provided with a transverse bore generally designated 12, the bore axis being perpendicular to the axis 11 of the insert and parallel to the axis of the gripping portion of the handle. The transverse bore has an inner section 14 which communicates with the receiving opening 2 and has a cross-section or diameter corresponding to the outer cross-section or diameter of the protruding part of the locking pin 4, the bore further having an outer section 15 which communicates with both the inner section 14 and the exterior of the pusher or handle 1 and has a cross-section or diameter substantially smaller than that of the inner section 14.

Figure 3:
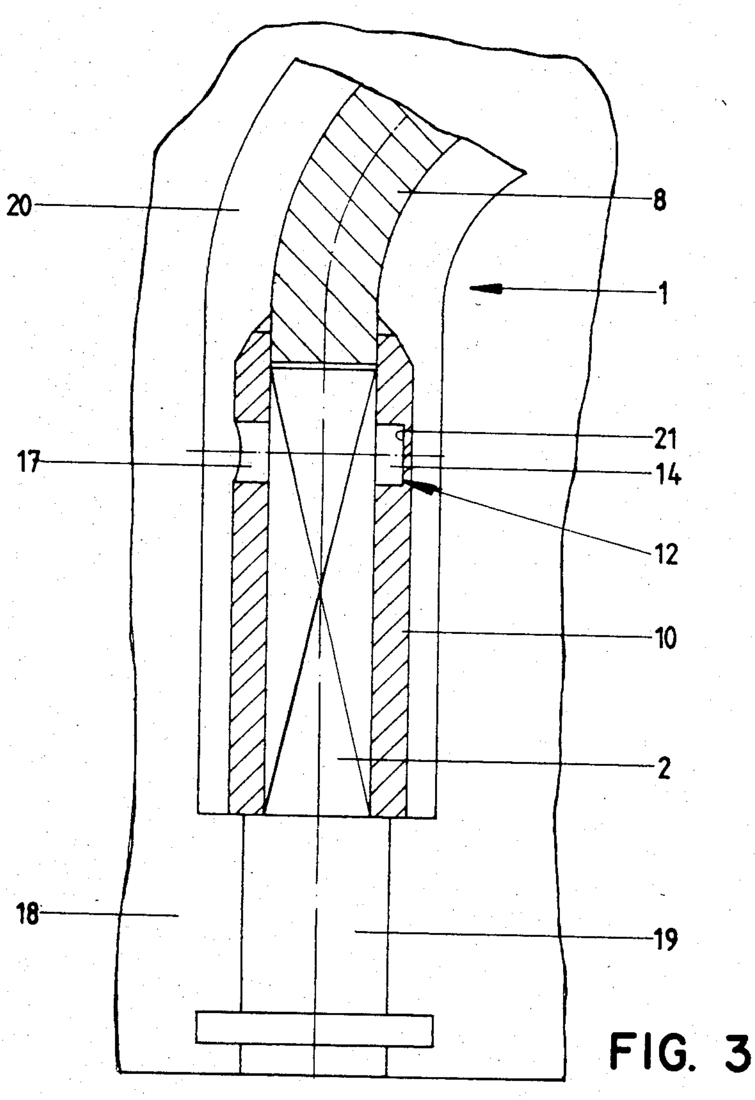
FIG. 3 is a fragmentary schematic illustration of the disposition of one of the door pusher members of FIG. 1 in an injection mold.

In order to enable the mounted member 1 to be joined to the mounting member, the prong 3 of the latter is so arranged with respect to the opening 2 that when the prong is inserted in the opening with the member 1 in its operational orientation, the locking pin 4 is aligned with and ultimately projects into the inner section 14 of the transverse bore 12 and thereby interconnects the two members without any freedom for play. A releasing of this connection is then possible by sticking a steel pin or rod of small diameter into the outer section 15 of the transverse bore from the exterior of the handle or mounted member 1 and pushing the rod in until the locking pin 4 has completely left the inner section 14 of the transverse bore and is confined within the recess 5 in the prong 3, at which point the prong can be withdrawn from the opening 2.

Where mounted door pusher members of this type are made of synthetic plastic material, the insert 10 and the core 8 are surrounded on all sides by an outer covering 16 of molded synthetic plastic material. In order to simplify the production of the members 1, therefore, and above all to avoid the need for complicated injection molds, the process according to the present invention is as follows:

The insert tube or sleeve 10 is first produced and welded to the steel core 8 (assuming the latter is present at all). In the insert 10 a hole 17 running transversely to the axis of the insert is first formed, this hole 17 extending completely through the portion (the left portion in FIG. 3) of the wall of the insert 10 lying opposite the transverse bore 12, the latter in its portion (the right portion in FIG. 3) of the wall of the insert 10 at this time being in the form of a blind recess which is open only toward the interior of the insert and is bounded at its outer end by an unperforated portion of the wall of the insert. The unit constituted by the insert 10 and the core 8 is then, as schematically illustrated in FIG. 3, positioned in an injection mold 18, with a core 19 of a diameter or cross-section corresponding to that of the opening 2 being received in the latter, which fixes the insert in position and simultaneously blocks the opening 2 and the hole 17. The synthetic plastic material is then injected into the mold cavity about the insert 10 and core 8, the molding material filling the cavity of the mold 18 and consequently also entering the hole 17 from the outside. The inner section 14 of the transverse bore 12 thus remains free of molding material, since on the one hand access to the opening 2 is prevented by the core 19 and on the other hand the other end of the bore 12 is closed by the thin as yet unperforated wall portion 21 of the insert 10.

After the molded article has been removed from the mold, the outer section 15 of the transverse bore 12 is formed by drilling through the outer cover 16 and the insert tube wall section 21 from the outside.

As shown in FIGS. 1 and 3, in the member 1 according to this embodiment of the invention the transverse bore 12 preferably is not located, as would normally be the case, on the underside of the mounting portion of the member, but rather at an intermediate location on the inner side. This leads to the advantage that the position of the transverse bore 12 is independent of whether the pusher is a "right-handed" or "left-handed" member, which in turn materially simplifies stock maintenance requirements and above all in the case of combinations of pusher handles and knobs or of differently colored pusher members affords substantial advantages.

Figure 4:
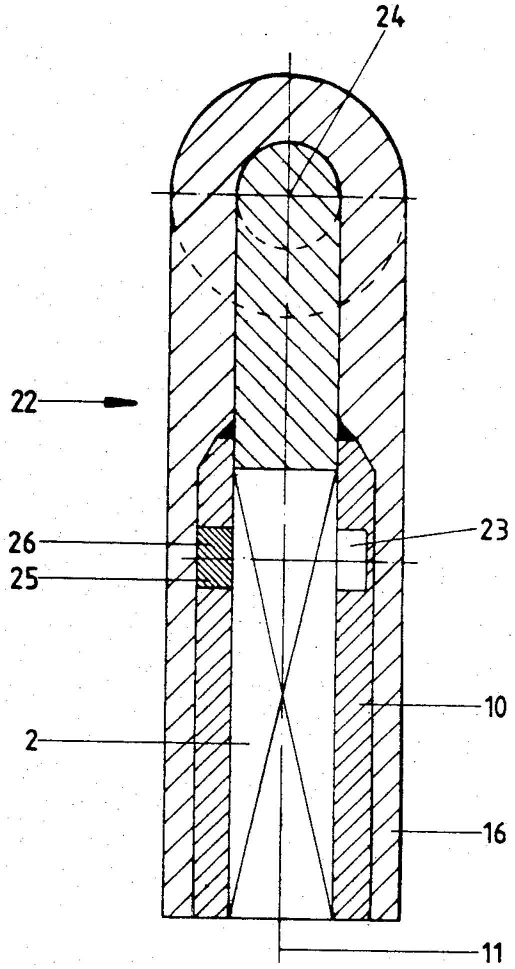
FIG. 4 is an axial section through a modification of the fastening arrangement of FIG. 1.

The transverse bore 12 may, of course, be positioned at the underside of the pusher or mounted member 1, in which case the construction will preferably be as indicated in FIG. 4. This view shows a pusher member 22 in a position at 90° to the position of the member 1 shown in FIG. 1. The pusher member 22, like the member 1, is provided with a receptacle or receiving opening 2, an insert 10 welded to a core, and a synthetic plastic outer covering 16. In contrast to the member shown in FIGS. 1 and 3, however, the axis of the inner section 23 of the transverse bore is both perpendicular to the axis 11 of the opening 2 and perpendicular to the axis 24 of the gripping portion of the pusher member 22. Over and above that, prior to the injection operation the hole 25, which corresponds to the hole 17 shown in FIG. 3, is filled with a plug 26 made either of metal or of a different material that does not bond to the injected molding material, so that the hole 25 will not be filled with molded material.

Upon completion of the injection molding operation for the member 22, the associated outer section (not shown in FIG. 4) of the transverse bore can then be formed by drilling in from the right, in a fashion analogous to that described with reference to FIG. 3, in which case the inner section 23 and the subsequently formed outer section constitute the transverse bore. Alternatively, the outer section can be formed from the left in FIG. 4 by drilling through the wall of plastic overlying the hole 25 until the latter has been reached and the plug 26 expelled therefrom to the interior of the insert 10 for removal. In this case the transverse bore which will cooperate with the locking pin 4 consists of the hole 25 forming the inner section of the transverse bore and the subsequently formed outer section (not shown) communicating with the hole 25. The formation of the outer section of the transverse bore in this embodiment of the invention is effected in dependence on the type of door with which the pusher member 22 is to be used.

Figure 5:
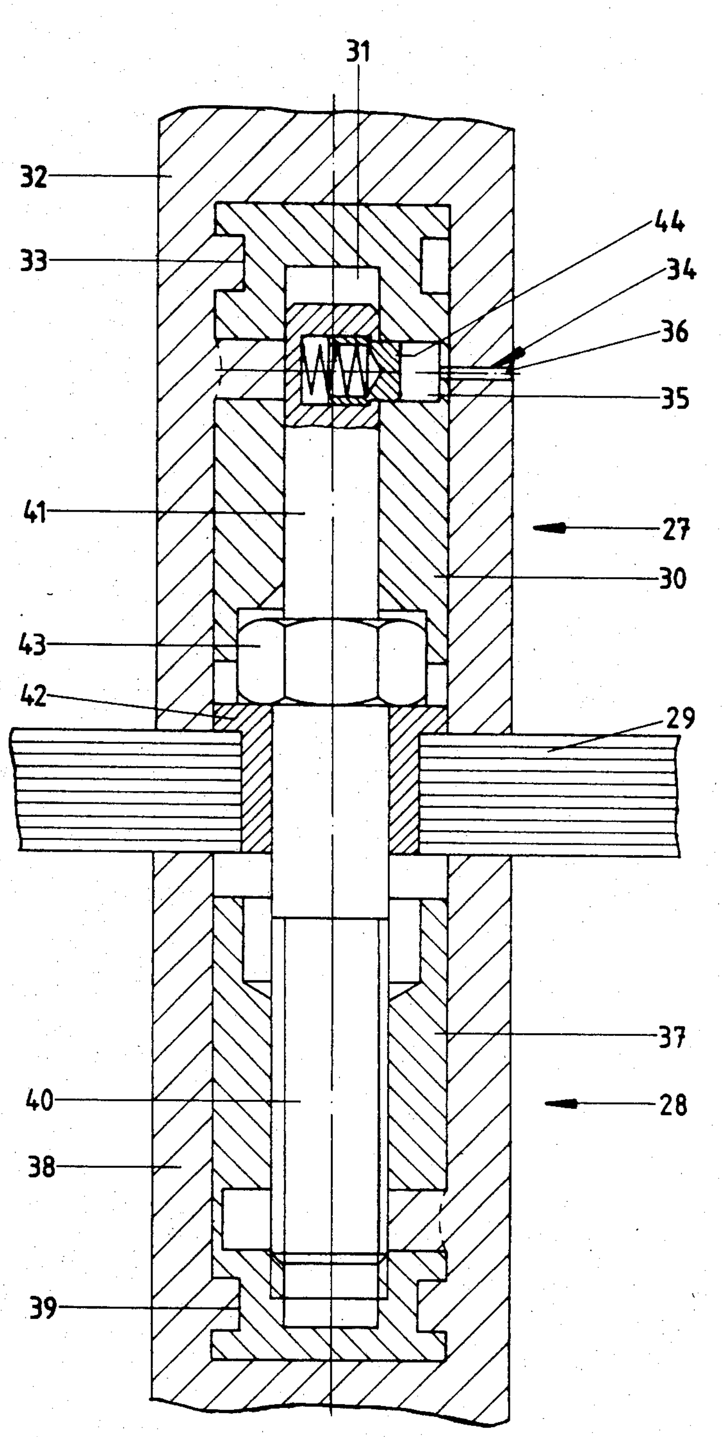
FIG. 5 is a fragmentary axial section through a fastening arrangement according to the present invention as embodied in two opposed pulling/pushing handles or grips for a door.

The described fastening arrangement can also be used, in a manner analogous to its use in the interconnection of a mounting and a mounted member, for interconnecting what are effectively two mounted members with a common support, for example where the two members are in the form of a pair of pushing/pulling grips 27, 28 for the opposite faces of a door 29, especially a glass door, as shown in FIG. 5. The first grip 27 includes a sleeve-shaped or tubular insert 30 defining a receiving opening 31, the insert being surrounded by an injection molded outer covering 32 of synthetic plastic and having at the end region directed away from the door 29 an annular groove 33 into which the molded material extends to prevent the outer covering 32 from being removed from the insert 30. As in the embodiment of FIG. 1, the grip 27 is provided with a transverse bore 34 which has an inner section 35 of relatively large diameter and an outer section 36 of relatively small diameter. The inner section 35 of the transverse bore 34 is initially formed in the wall of the insert 30 in the form of a blind recess.

The second grip 28 includes a sleeve-shaped or tubular internally threaded insert 37 which is surrounded by an outer coating 38 of synthetic plastic material injection molded thereonto and is provided at the end region thereof directed away from the door 29 with an annular groove 39 into which the molded material extends to prevent the outer coating of plastic material from being separated from the insert 37. Screwed into the insert 37 is a mounting bolt 40 which has a threaded section located within the confines of the insert 37 and an unthreaded section 41 which, when the grip 28 is mounted, projects through the door 29 via a bushing 42 fitted into an aperture in the door. The bolt also carries a hexagonal head or enlarged section 43, the bolt section 41 being extended beyond the latter. At its end region directed away from the door 29, the bolt section 41 carries a locking pin 44 which corresponds to the locking pin 4 of the embodiment shown in FIG. 1 and in the operating condition extends into the inner section 35 of the transverse bore 34.

The mounting of the two grips 27 and 28 starts with the grip 28 being held against the door 29 in a manner that can be understood from FIG. 5, i.e. with the internally threaded bore of the insert 37 axially aligned with the opening in the door and the bushing 42 mounted therein. Thereafter the mounting bolt 40 is screwed into the insert 37 from the other side of the door, until the grip 28 seats tightly against the door and the head 43 assumes such an angular position that, upon the grip 27 being fitted onto the bolt section 41, the locking pin 44 is able to enter the inner section 35 of the transverse bore 34. In order to ensure that such an angular position of the head or section 43 can be achieved in all cases, either the threaded section 40 of the mounting bolt and/or the associated portion of the insert 37 and/or the centering bushing 42 are made sufficiently deformable, for example, of a slightly yieldable synthetic plastic material. Once the insert 30 has been slipped onto the unthreaded section 41 of the mounting bolt and the locking pin 44 has entered the transverse bore section 35, of course, the two grips 27 and 28 are fixedly interconnected with one another. They can, however, be disconnected from one another by pushing a steel pin or rod or the like into the outer section 36 of the transverse bore 34 to depress the locking pin 44 against the force of its biasing spring.

A control over the correct angular position of the bolt section 41 is further rendered possible by virtue of the fact that the opening 31 at its outermost end facing the door is enlarged to a hexagonal recess which only at correct positioning of the section 41 fits onto the hexagonal head 43.

In the embodiment of FIG. 6, two mounted members in the form of arms 46 and 47 for holding towels are provided, which arms are releasably connected with one another. The first arm 46 is provided with a receiving opening 48 which is formed in an insert 49 having the shape of a hollow cylindrical sleeve that is fixed in the central bore of one end of the arm 46 and has a section projecting from that end of the arm, the sleeve section being rotatably received in a coaxial bore of a base or support 51. The latter is affixed to a wall or like surface by means of screws or bolts extending through holes 52, and it is covered by a cover plate 53 which has a corresponding hole therein for accommodating the projecting section of the insert 49. The end of the second arm 47 facing the first arm 46 has a central bore 54 in which is mounted a cylindrical prong 55 which has a section projecting beyond the end of the arm 47 and into the bore of the base or support 51 via a hole provided appropriately in the cover 53, this prong section being rotatably receivable in the opening 48 of the arm 46 and carrying at its outer end a locking pin 56 corresponding to the locking pin 4 of the embodiment of FIG. 1. In the mounted condition of the two arms 46 and 47, the locking pin 56 engages behind the innermost end or rear edge of the insert 49 in a free space 57 which is formed by the extension 50 of the center bore of the arm 46 behind this rear edge. In order to enable the so-formed connection between the arms 46 and 47 to be released, the wall section of the arm 46 juxtaposed to the space 57, i.e. the place where the locking pin 56 is located when in its operational state, is provided with a bore 58 of small diameter relative to that of the locking pin 56, the bore 58 (the outer section) together with the free space 57 (the inner section the cross-section of which must correspond at least to that of the locking pin 56) constituting a transverse bore oriented perpendicular to the axis of the opening 48 and corresponding to the transverse bore 12 in the embodiment of FIG. 1. The embodiment of FIG. 6 is also characterized by the advantage that the inner section of the transverse bore can be formed in a simple manner and that no complicated measures are required during the injection molding of the arm 46.

In order to enable the prong 55 to be extracted from the base or support 51 after the locking pin has been pressed inwardly without the locking pin coming to project into the open screw hole 52 where the projecting section of the insert 49 is not located, the base or support 51 is provided, as shown in FIG. 6, with a longitudinal groove 72 matching the cross-section of the locking pin 56.

FIGS. 7 and 8 show a mounting member and a mounted member, respectively, the former being in the form of a base or support 59, and the latter being in the form of an upper or cover housing section 60, for the frame of a letter drop or mail box. The member 59 has a generally rectangular cross-section, a correspondingly shaped central opening 61, and screw holes 62 in its corners for enabling it to be affixed to a wall or a door. The member 60 consists of a cover-shaped structure which has a wall 63 adapted to overlie the four side portions of the member 59, a rectangular central opening 64, and a side wall 65 extending peripherally around the wall 63 in perpendicular relation thereto. The dimensions of the space bounded by the side wall 65 correspond essentially to the outer dimensions of the member 59, to ensure that the member 60 seats free of play on the member 59. To aid in such stable seating of the two members one on the other, the member 59 is provided at one of its edges (the upper one in FIG. 7) with a pair of struck out elements 66 which cooperate with corresponding struck out elements 67 provided at corresponding locations on the side wall 65 of the member 60. For interconnecting the two members there are provided in one portion (the lower one in FIG. 8) of the side wall 65 a pair of transverse bores 68, and at corresponding locations on the member 59 there are provided two axially displaceable and resiliently depressable locking pins 69 each corresponding to the locking pin 4 in the embodiment of FIG. 1. It will be noted, of course, that, in something of a departure from the embodiments of FIGS. 1 to 6, in the embodiment of FIGS. 7 and 8 the entire base or support 59, i.e. the mounting member, can be introduced into the receiving opening formed by the side wall 65 of the cover section 60, i.e. the mounted member. Even in the embodiment of FIGS. 7 and 8, however, the locking pins 69 engage in a pair of relatively large inner sections 70 of the transverse bores 68 upon seating of the member 60 on the member 59, with each of these sections being in the form of an elongated or oval recess. In order to avoid having the locking pins 69 accessible over the entire length and width of the bores 68, the inner sections 70 of these bores communicating with the receiving opening 64 are initially formed as blind recesses, while the outer sections 71 which are subsequently drilled to extend from the inner sections 70 to the outer surface of the side wall 65 have a much smaller diameter than the locking pins 69. The transverse bores 68, therefore, as in the previously described embodiments, consist of relatively large inner sections 70 accommodating the locking pins 69 and relatively small outer sections 71 which can be located in a generally hidden manner and provide access to the locking pins only by means of a special tool.

It will be understood that since the member 59 and the member 60 may constitute, for example, the frame of a letterbox which may be exposed to large temperature variations, the arrangement which enables the locking pins 69 according to the present invention to be received in elongated sections of the transverse bores 68 and the provision of the respective struck out portions 66, 67 on the two members make possible a relative movement between the two members under external temperature variations and the consequent expansions or contractions especially of the member 60.

The invention is, of course, not limited to the embodiments described herein. By way of example, it is also possible in the embodiments of FIGS. 1 to 5 first to produce the synthetic plastic outer cover 16 or 38 of a mounted member by means of an injection molding operation and then, in a manner analogous to that indicated by FIG. 6, to place the insert 10 or 30 subsequently into the outer covering and to secure it therein by bonding, screwing or in any other suitable manner. This leads to the advantage that the inserts need not be first provided with blind recesses, it being possible to have the transverse bore formed right from the beginning to completely traverse the insert wall. There is also the advantage that the outer sections of the transverse bores can already be formed in the outer plastic covering of the mounted member during the injection molding of the same, i.e. they need not be later drilled through. Moreover, very simple injection molds can be used as in the case of the embodiments of FIGS. 1 to 6.

The material of which the inserts are made can be of any desired type. In many cases it will be preferred to utilize inserts of metal, e.g. steel, to ensure that the mounted members of the present invention will retain their ability to function even in case of fire, which is especially important in the case of such members mounted on fire doors. Also, in place of the plug 26 shown in FIG. 4 it would be possible to place a cap over the hole 25, which then need merely be drilled through after the injection molding operation.

In addition to having the various embodiments of the invention constructed as shown in FIGS. 1 to 8, with each consisting of a first member having provided therein a receiving opening into which the second member can be inserted in part or in its entirety it is possible to provide two or more receiving openings on the first member and to associate such receiving openings each with a respective second member or a male part thereof, or with the appropriate number of male parts of a single second member. The upper member, for example, of a wall-supported shelf or a toothbrush and dental hygiene cup holder can be provided at its back side with two receiving openings which can be fitted onto respective plug- or block-like elements of a mounting member affixed to the wall, being secured to these elements by means of the fastening arrangement according to the present invention. Each of these elements thus constitutes a member that can be introduced in toto into an associated receiving opening. As yet another example, the mounted member could be a substantially U-shaped grip designed to be used as a bathtub or shower safety bar. Such a member would have one (or even both) of its end arms constructed as shown for the member 1 in FIG. 1 and would be associated with a plate affixed to a bathroom or shower wall, the plate having two projecting prongs adapted to mate with the respective receiving openings, and the appropriate one (and in the alternative case even both) of the prongs being equipped with a locking pin such as the pin 4 in FIG. 1. Still further, a plurality of first or mounted members, e.g. coat hooks, could be provided, each having a respective receiving opening, which members could be juxtaposed to a second or mounting member, e.g. a wall bar, provided with a plurality of locking pinequipped male elements capable of entering the receiving openings. In this case, therefore, the second member would be combined with a plurality of first members.

In yet another possible variation of the invention, the production method illustrated in FIG. 3 could be modified by providing the insert 10 only with the hole 17, which would be covered or closed by a plug during the injection molding operation, and concomitantly omitting the blind recess used to form the transverse bore section 14.

What is claimed is:

1. A fastening arrangement of releasably interconnectable mounted and mounting members, wherein (a) said mounting and mounted members are components of a composite structure and have the form of, respectively, an underpart adapted to be affixed to a wall or like support and an upper part adapted to be secured to said underpart;

(b) said upper part having a peripheral side wall defining a receiving opening;

(c) said underpart being adapted to be accommodated substantially in its entirety within said receiving opening and carrying a plurality of transversely displaceable locking pins resiliently biased outwardly of the underpart into a projecting position;

(d) said upper part being provided within the confines of its receiving opening with a corresponding plurality of transverse bores which extend from the receiving opening to the exterior of the upper part and are located in a portion of said side wall corresponding to the location of said locking pins on said underpart for entry of the locking pins thereinto upon introduction of said underpart into said receiving opening;

(e) said transverse bores each having an inner section communicating at one end with the receiving opening, and an outer section communicating at one end with exterior of said upper part and at its other end with the other end of said inner section;

(f) said inner section of each transverse bore having a cross-section or diameter substantially corresponding to that of its respective locking pin; and (g) said outer section of each transverse bore having a cross-section or diameter that is small relative to that of its respective inner section and provides a passage of limited noticeability for access of a thin tool into said transverse bore from the exterior of said upper part for forcing its respective locking pin from its respective inner section.

2. A fastening arrangement as claimed in claim 1, characterized in that said inner section of each of said transverse bores is, except for its juncture with its respective outer section, in the form of a blind recess.

3. A fastening arrangement as claimed in any of claim 1 or 2, characterized in that said inner section of each of said tranverse bores has the form of an elongated or oval opening.

4. A fastening arrangement of releasably interconnectable mounted and mounting members, wherein (a) said mounting and mounted members are components of a composite structure and have the form of, respectively, an underpart adapted to be affixed to a wall or like support and having a portion in the form of an unthreaded section of an elongated bolt which section projects from the wall or the like support and has an enlarged section, the unthreaded section being extended beyond the latter, and an upper part adapted to be secured to said portion;

(b) said upper part having a peripheral side wall defining a receiving opening;

(c) said portion being adapted to be accommodated substantially in its entirety within said receiving opening and carrying a transversely displaceable locking pin resiliently biased outwardly of said portion into a projecting position;

(d) said upper part being provided within the confines of its receiving opening with a transverse bore which extends from the receiving opening to the exterior of the upper part and is located in a portion of said side wall corresponding to the location of said locking pin on said portion for entry of the locking pin thereinto upon introduction of said portion into said receiving opening;

(e) said transverse bore having an inner section communicating at one end with the receiving opening, and an outer section communicating at one end with the exterior of said upper part and at its other end with the other end of said inner section;

(f) said inner section of said transverse bore having a cross-section or diameter substantially corresponding to that of said locking pin; and (g) said outer section of said transverse bore having a cross-section or diameter that is small relative to that of said inner section and provides a passage of limited noticeability for access of a thin tool into said transverse bore from the exterior of said upper part for forcing said locking pin from said inner section.

5. A fastening arrangement of releasably interconnectable mounted and mounting members, wherein (a) said mounting and mounted members are components of a composite structure and have the form of, respectively, an underpart adapted to be affixed to a wall or like support and at least having a portion which projects from the wall or the like support and an upper part adapted to be secured to said portion;

(b) at least said upper part is made of molded synthetic plastic material having a peripheral side wall and includes an insert imbedded in said molded material and defining a receiving opening and at least a portion of a transverse bore, said insert being provided with a peripheral groove in its outer surface and the molded synthetic plastic material filling said groove;

(c) said portion being adapted to be accommodated substantially in its entirety within said receiving opening and carrying a transversely displaceable locking pin resiliently biased outwardly of the portion into a projecting position;

(d) said transverse bore extends from the receiving opening to the exterior of the upper part and is located in a portion of said insert and side wall corresponding to the location of said locking pin on said portion for entry of the locking pin thereinto upon introduction of said portion into said receiving opening;

(e) said transverse bore having an inner section communicating at one end with the receiving opening, and an outer section communicating at one end with the exterior of said upper part and at its other end with the other end of said inner section;

(f) said inner section of said transverse bore having a cross-section or diameter substantially corresponding to that of said locking pin; and (g) said outer section of said transverse bore having a cross-section or diameter that is small relative to that of said inner section and provides a passage of limited noticeability for access of a thin tool into said transverse bore from the exterior of said upper part for forcing said locking pin from said inner section.

6. A fastening arrangement as claimed in claim 5, characterized in that said insert is provided at a location coaxially opposite said inner section of said transverse bore with a transverse hole having the same corss-section or diameter as said inner section of said transverse bore for selectively receiving said locking pin.

7. A fastening arrangement of releasably interconnectable mounted and mounting members, wherein (a) said mounting and mounted members are components of a composite structure and have the form of, respectively, an underpart adapted to be affixed to a wall or like support and at least having a portion which projects from the wall or the like support, and an upper part adapted to be secured to said underpart, (b) said upper part having a hollow cylindrical sleeve therewithin defining a receiving opening, said sleeve having an innermost edge, (c) said portion being adapted to be accommodated substantially in its entirety within said receiving opening and carrying at a free end thereof a transversely displaceable locking pin resiliently biased outwardly of the portion into a projecting position, (d) said upper part being provided behind the innermost edge of said sleeve with a free space, said space receiving said free end of said portion and said locking pin upon introduction of said portion into said receiving opening, and said space having a cross-section for allowing displacement of said locking pin into said projecting position behind said innermost edge of said sleeve, and (e) a thin bore extending from said space to the exterior of said upper part, said thin bore having a cross-section or diameter that is small relative to said space and provides a passage of limited noticeability for access of a thin tool into said space from the exterior of said upper part for displacing said locking pin from said projecting position.

8. A fastening arrangement of releasably interconnectable mounted and mounting members, wherein (a) said mounting and mounted members are components of a composite structure and have the form of, respectively, an underpart adapted to be affixed to a wall or like support and a first and a second upper part adapted to be rotatably secured to said underpart, (b) said underpart having a bore extending therethrough and having two ends, (c) said first upper part having a first receiving opening which is formed in a hollow sleeve having an innermost edge and being fixed in said first upper part, said sleeve having a portion which projects from said first upper part and is rotatably received in said bore from one end thereof, (d) the second upper part having a second receiving opening and comprising a cylindrical prong which is mounted in said second receiving opening and has a section projecting therefrom and rotatably extending through said bore from the other end thereof and into said first receiving opening, said prong section having a free end for projecting beyond said innermost edge of said sleeve, (e) a transversely displaceable locking pin carried by said free end of said prong section and being resiliently biased outwardly of the prong section into a projecting position, (f) a free space defined in said first upper part behind said innermost edge of said sleeve, said space receiving said free end of said prong section and said locking pin upon introduction of said prong section into said bore and said first receiving opening, and said space having a cross-section for allowing displacement of said locking pin into said projecting position behind said innermost edge of said sleeve and rotation of said prong section when said locking pin is in said projecting position behind said innermost edge of said sleeve, and (g) a thin bore extending from said space to the exterior of said first upper part, said thin bore having a cross-section or diameter that is small relative to said space and provides a passage of limited noticeability for access of a thin tool into said space from the exterior of said first upper part for displacing said locking pin from said projecting position.

* * * * *